United States Patent Office 3,201,935
Patented Aug. 24, 1965

3,201,935
TRIALKYLCYCLOHEXANE HIGH ENERGY FUELS
AND PROPULSION PROCESS
John O. Smith, Swampscott, and Alma M. Pomponi, Peabody, Mass., assignors to Monsanto Research Corporation, St. Louis, Mo., a corporation of Delaware
No Drawing. Filed July 31, 1962, Ser. No. 213,599
5 Claims. (Cl. 60—35.4)

This invention relates to high energy fuels. More particularly, this invention relates to methods of developing thrust and to methods of operating reaction type power plants. This invention especially contemplates a high energy fuel composition comprising a trialkylcyclohexane as an essential ingredient.

The development of reaction type power plants has been accompanied by the requirement for developing fuels suitable for use in such engines. In a reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet propulsion type engine, such as a rocket, ram-jet, turbojet, or pulse-jet engine, exhaustion of the high temperature gases is directed in a rearward direction to produce a true jet propulsion. In a turbine type engine, such as a gas-turbine or a turbo-prop engine, the exhaustion of the high temperature gases is directed into a turbine which drives a propeller or other mechanical means for developing a forward thrust. Reaction power plants may be used in widely different types of vehicles such as in space ships, aircraft, boats, guided missiles, automobiles and the like.

Heretofore it was believed that many hydrocarbons did not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as 500° F. or higher, but the presently available JP-4 fuel is thermally stable to a temperature of only about 400° F. Therefore, it is desirable to have a fuel which is thermally stable at temperatures at least as high as 500° F.

Another serious disadvantage of the prior art known fuels is the low heat of combustion of such fuels. Aircraft generally, and particularly military aircraft, are being designed for higher and higher speeds requiring higher energy level fuels. The fuel must not only have a high energy level on a weight basis or high B.t.u./lb., but also a high energy level on a volume basis or a high B.t.u./gal., since wing sections are being made thinner in order to reduce drag and the space for storage of fuel is limited. Thus, aircraft are very often volume-limited as well as weight-limited for the storage of fuel. Aircraft are particularly volume-limited using the currently available JP-6 high energy fuel which has a heat of combustion of 18,400 B.t.u./lb. on a weight basis, but a heat of combustion of only 119,500 B.t.u./gal. on a volume basis. Therefore, it is particularly desirable to provide a high energy fuel having a high heat of combustion on a volume basis, preferably greater than 120,000 B.t.u./gal., and at the same time obtain the other characteristics necessary for a good fuel of this type.

Another disadvantage of the presently known fuels is that they have high vapor pressures and tend to flash-off rapidly in power plants operated at high elevations and high temperatures, thereby resulting in an appreciable loss of fuel. Although this difficulty can be overcome by pressurizing the fuel tanks, the structural strength of the fuel tanks must also be increased, adding to the weight and volume of the vehicle.,Thus, present day aircraft using the current JP-6 fuel are both altitude limited and weight limited because such fuel has a boiling point in the range of from 300° F. to 350° F. It is desirable that a fuel have a boiling point at least above 400° F. in order to overcome these limitations.

An object of this invention is to provide high energy fuel compositions for use in reaction type power plants.

Another object of this invention is to provide improved methods of developing thrust.

Another object of this invention is to provide improved methods of operating reaction type power plants, particularly jet propulsion type engines, including rocket, ram-jet, turbo-jet, and pulse-jet engines, and turbine type engines, including turbo-prop and gas-turbine engines.

These and other objects are attained by providing a restricted class of trialkylcyclohexanes as an essential component of high energy fuel compositions.

The trialkycyclohexanes of this invention are cyclohexanes having three different alkyl groups attached to the alicyclic ring and having no more tahn six carbon atoms in any alkyl group. Examples of the trialkylcyclohexanes of this invention are methylethyl-i-propylcyclohexane, methylethyl-t-butylcyclohexane, ethylpropylhexylcyclohexane, methylbutylpentylcyclohexane, etc.

The trialkylcyclohexanes of this invention may be prepared by several methods such as the hydrogenation of the corresponding trialkylbenzene, the acetylation of p-cymene followed by hydrogenation, etc. using standard acetylation and hydrogenation conditions.

The trialkylcyclohexanes of this invention are mobile liquids having boiling points at or above 400° F. decomposition temperatures in excess of 700° F. and net heats of combustion above 125,000 B.t.u./gal.

In contrast, many alkylcyclohexanes have boiling points well below 400° F. which makes them of marginal value as high energy fuels. For example, the boiling points of the following alkylcyclohexanes are reported in the literature as

| | ° C. | ° F. |
|---|---|---|
| Ethylcyclohexane | 132 | 270 |
| Dimethylcyclohexane (3 isomers) | 119-124 | 246-255 |
| Isopropyl-4-methylcyclohexane | 167 | 332 |
| Trimethylcyclohexane | 137-140 | 278-284 |
| Tetramethylcyclohexane | 161 | 332 |

The following examples are given in illustration and not in limitation of the scope of this invention.

EXAMPLE 1

Hydrogenate ethylmethyl-t-butylbenzene (commercially available) by subjecting it to a pressure of 2700 p.s.i.g. hydrogen at a temperature of about 125° C., in the presence of a catalyst comprising finely divided nickel deposited on a kieselguhr base. The reaction is preferably carried out in an inert solvent such as hexane. When the reaction is complete, remove catalyst residues by centrifugation or filtration. Separate the product from solvent and unreacted starting material by distillation preferably in vacuo. The product is ethylmethyl-t-butylcyclohexane having the properties set forth in Table I. This trialkylcyclohexane may be used (1) per se as a high energy fuel in combination with the conventional additives such as antioxidants, viscosity improvers, etc., or (2) it may be added to more conventional fuels to upgrade them particularly in the area of net heat of combustion on a volumetric basis.

EXAMPLE 2

Acetylate p-cymene by reacting it in an inert solvent such as cyclohexane, ethylene dichloride, etc., with acetyl chloride in the presence of a Friedel-Crafts catalyst e.g. anhydrous aluminum chloride at −5 to 5° C. Purify the reaction product by hydrolysing the catalyst with dilute hydrochloric acid, followed by filtration and distillation at atmospheric pressure to remove solvent, and then distillation under vacuum to separate the reaction product from unreacted p-cymene. Hydrogenate the purified product by heating it in an inert solvent e.g. hexane, under a pressure of about 2400 p.s.i.g. of hydrogen in the presence of nickel on kieselguhr catalyst at temperatures of 80° C. to 250° C. The reaction begins at the lower temperature and is completed by slowly raising the temperature to 250° C. and then maintaining the reaction mixture at 250° C. for six hours. Purify the reaction product by centrifugation or filtration to remove catalyst followed by distillation at atmospheric pressure to remove solvent and finally by vacuum distillation. The product is an isomeric mixture of ethylmethyl-i-propylcyclohexanes having the properties set forth in Table I. The product may be used per se as a high energy fuel admixed with conventional modifiers such as antioxidants, viscosity improvers, etc. or may be added to conventional fuels to upgrade them particularly with respect to net volumetric heat of combustion.

Table I

|  | Trimethylcyclohexane [1] | Ethylmethyl-i-propylcyclohexane | Ethylmethyl-t-butylcyclohexane |
| --- | --- | --- | --- |
| H/C ratio | 0.168 | 0.168 | 0.168 |
| Boiling Point: | | | |
| ° C | 138.5 | 205.6 | 212.2 |
| ° F | 280 | 402 | 414 |
| Density at 20° C | 0.760 | 0.839 | 0.81 |
| Heat of Comb., B.t.u./lb., net | 18,570 | 18,655 | 18,630 |
| Heat of Comb., B.t.u./gal., net | 117,780 | 130,600 | 127,290 |
| Viscosity, cs., at— | | | |
| 100° F | 0.71 | 1.52 | 2.10 |
| 200° F | 0.44 | 0.79 | 0.86 |
| 300° F | | 0.56 | 0.55 |
| Thermal Decomp. Temp.,° F | 788 | 708 | 721 |

[1] These figures are included to indicate the difference between a symmetrical trialkylcyclohexane and the trialkylcyclohexanes of this invention.

Heats of combustion were obtained with a Parr oxygen bomb calorimeter on both a weight and a volume basis following the ASTM D-240-57T procedure. Density was determined at a temperature of 99° C., using a Lipkin bicapillary pycnometer. Viscosities at various temperatures were measured using the standard Cannon-Fenske capillary viscosimeter following ASTM D-445 procedure.

The thermal decomposition temperature was obtained using a high temperature, high pressure isoteniscope which consists of a Monel bomb capped at one end and connected to a precision pressure gauge by a Monel diaphragm. The test fuel was heated within the bomb to an elevated temperature under high pressure and the temperature was measured at which the fuel began to decompose and evolve gas as determined by the changes in pressure within the bomb. In this method, the formation of deposits in the decomposition reaction is not measured because some fuels may start to decompose to gas before forming deposits.

The above examples indicate that the trialkylcyclohexanes of this invention are very suitable for use in various reaction type power plants. The trialkylcyclohexanes have particularly high heats of combustion on a volume basis and may therefore be very advantageously employed in both jet propulsion type engines and gas-turbine engines where there is a space limitation for the storage of fuel. Thus, the 130,600 B.t.u./gal. heat of combustion of ethylmethyl-i-propylcyclohexane permits a jet propulsion aircraft to fly considerably further than an aircraft having the same size storage tanks and using the currently available JP-6 fuel which has a heat of combustion of only 119,500 B.t.u./gal. Another advantage in utilizing the trialkylcyclohexane fuels of this invention in reaction type power plants is that these fuels have low freezing points and relatively high boiling points, thus possessing a very broad boiling range. A broad boiling range fuel is very necessary for use in aircraft type engines where the engine is subjected to not only low temperatures, either on the ground or in the air, but also to low pressures at high altitudes. If the freezing point of the fuel is too high, the viscosity of the liquid fuel may become so great as to make supplying the fuel to the engine very difficult or almost impossible. If the fuel has a very low boiling point, large amounts of the fuel will be lost at higher altitudes by vaporization unless the system is fully pressurized. Thus, the relatively high boiling point of ethylmethyl-t-butylcyclohexane permits an aircraft to operate at considerably higher temperatures than an aircraft using the JP-6 fuel having a lower boiling point.

The trialkylcyclohexanes of this invention are also characterized by unusually high thermal stabilities when employed as fuel in a reaction type power plant. This factor is of importance not only in the actual combustion taking place in the engine, but also in the fuel system prior to the burning step. For example, it is necessary in high speed aircraft to use the fuel reservoir to absorb the aerodynamic heat which builds up faster than can be dissipated to the atmosphere and thereby heats the fuel to a temperature of 500° F. or higher. If degradation of the fuel occurs, gum and coke are deposited in the fuel system, thereby seriously hampering the smooth flow of fuel from the reservoir into the combustion zone.

In operating reaction type power plants with the trialkylcyclohexane fuels of this invention, the fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turboprop, turbo-jet, pulse-jet and gas-turbine engines, the oxidizing agent is air which is compressed either by a mechanical compressor or aerodynamically. Also, in automotive and in ship applications, the oxidizing agent will ordinarily be air. In contrast to these applications, the oxidizing agent will usually be liquid oxygen or other chemical oxidizer, for example, fuming nitric acid, hydrogen peroxide, fluorine, and the like, in guided missile and rocket applications. In some applications, a mixture of oxidizing agents will also be useful.

The trialkylcyclohexane fuel compositions of the present invention may be blended with other materials such as gasoline, kerosene, mixtures of gasoline and kerosene, other aviation fuels, and with the present hydrocarbon jet fuels to produce an improved fuel over the presently available fuels. More particularly, the fuels described herein may be added to the present aliphatic hydrocarbon jet fuels having a heat of combustion of about 112,000 B.t.u./gal. to raise the overall heat of combustion thereof to at least about 120,000 B.t.u./gal. Moreover, the fuels described herein may be used in combination with fuel additives to improve various characteristics of the fuel, including liquid viscosity, burning characteristics, and the like.

In the operation of reaction type power plants using the fuel compositions of this invention, the fuel and oxidizing agent are charged into the combustion chamber in a proportion which gives rise to a combustible mixture. Where the oxidizing agent is air, the fuel-air ratio will ordinarily be mantained between 0.0005 and 0.15. The particular fuel-air ratio used will be dependent not only upon the power requirements at the moment but also upon the nature of the engine. Thus, turbo-bet engines are preferably operated on a fuel-air ratio of about 0.01 to 0.03 whereas ram-jet engines are usually operated at a fuel-air ratio of 0.03 to 0.07.

Reasonable variation and modification of the invention as described are possible, the essence of which is that there have been provided (1) high energy fuel compositions containing trialkylcyclohexanes as an essential ingredient, (2) improved methods of developing thrust, and (3) methods of operating reaction type power plants.

What is claimed is:

1. A method of developing thrust in a reaction chamber, said method comprising oxidizing a high energy fuel composition comprising, as an essential ingredient, a trialkylcyclohexane in which each alkyl group contains a different number of carbon atoms and in which each alkyl group may contain from 1 to 6 carbon atoms in said reaction chamber to produce a mass of high temperature gases and exhausting said gases from said reaction chamber so as to develop thrust.

2. The method of operating a reaction type power plant, said method comprising injecting a stream of an oxidizing agent and a stream of fuel comprising, as an essential ingredient, a trialkylcyclohexane in which each alkyl group contains a different number of carbon atoms and in which each alkyl group may contain from 1 to 6 carbon atoms into the combustion chamber of said reaction type power plant, oxidizing said fuel in said combustion chamber, and exhausting the resulting gases from said combustion chamber so as to impart thrust.

3. The method of operating a jet-propulsion engine, said method comprising injecting a stream of an oxidizing agent and a stream of a fuel comprising, as an essential ingredient, a trialkylcyclohexane in which each alkyl group contains a different number of carbon atoms and in which each alkyl group may contain from 1 to 6 carbon atoms into the combustion chamber of said jet-propulsion engine, oxidizing said fuel in said combustion chamber, and exhausting the resulting gases in a rearward direction from said combustion chamber so as to impart thrust to said jet-propulsion engine.

4. The method of operating a gas-turbine engine, said method comprising injecting a stream of an oxidizing agent and a stream of a fuel comprising, as an essential ingredient, a trialkylcyclohexane in which each alkyl group contains a different number of carbon atoms and in which each alkyl group may contain from 1 to 6 carbon atoms into the combustion chamber of said gas-turbine engine, oxidizing said fuel in said combustion chamber, and exhausting the resulting gases from said combustion chamber through a turbine to develop motive power.

5. The method of operating a turbo-jet engine, said method comprising injecting a stream of air and a stream of a fuel comprising, as an essential ingredient, a trialkylcyclohexane in which each alkyl group contains a different number of carbon atoms and in which each alkyl group may contain from 1 to 6 carbon atoms into the combustion chamber of said turbo-jet engine, burning said fuel in said combustion chamber, exhausting the resulting gases from said combustion chamber through a turbine to expand the same and compress the air supplied to said combustion chamber, and passing the gases into the atmosphere by way of a nozzle to impart thrust to said engine.

References Cited by the Examiner

UNITED STATES PATENTS

| | | | |
|---|---|---|---|
| 2,404,100 | 7/46 | Schmerling | 260—666 |
| 2,415,438 | 2/47 | McKinley et al. | 260—666 |
| 2,765,617 | 10/56 | Gluesenkamp et al. | 60—35.4 |
| 2,826,037 | 3/58 | Scott et al. | 60—35.4 |
| 3,058,300 | 10/62 | Kosmin | 60—35.4 |
| 3,098,106 | 7/63 | Edwards | 60—35.4 X |

CARL D. QUARFORTH, *Primary Examiner.*

LEON D. ROSDOL, *Examiner.*